ically active ingredient, in a quantity
United States Patent
Krenzer et al.

[11] 3,742,008
[45] June 26, 1973

[54] N-CYCLOALKYLTHIOCARBONYLOXY-SUBSTITUTED N-PHENYLUREAS

[75] Inventors: John Krenzer, Oak Park; S. B. Richter, Chicago, both of Ill.

[73] Assignee: Velsicol Chemical Corporation, Chicago, Ill.

[22] Filed: June 26, 1971

[21] Appl. No.: 147,175

Related U.S. Application Data

[62] Division of Ser. No. 781,584, Dec. 5, 1968, Pat. No. 3,637,795.

[52] U.S. Cl. .............................. 260/455 B, 71/100
[51] Int. Cl. ........................................... C07c 154/00
[58] Field of Search ................. 260/455 B; 71/120, 71/100

[56] References Cited
UNITED STATES PATENTS

| | | | |
|---|---|---|---|
| 3,388,153 | 6/1968 | Johnson | 71/120 |
| 3,001,861 | 9/1961 | Fischer et al. | 71/120 |
| 2,753,251 | 7/1956 | Gerjovich | 71/120 |
| 3,419,620 | 12/1968 | Becher et al. | 71/100 |
| 3,439,018 | 4/1969 | Brookes et al. | 71/120 |
| 3,597,467 | 8/1971 | Richter et al. | 260/455 A |

*Primary Examiner*—Lewis Gotts
*Assistant Examiner*—G. Hollrah
*Attorney*—Robert J. Schwarz

[57] ABSTRACT

This invention discloses new chemical compounds of the formula

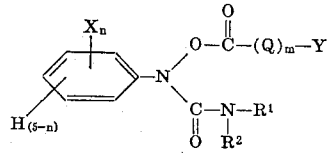

wherein X is selected from the group consisting of alkyl, alkenyl, halogen, haloalkyl, alkoxy, alkylthio, nitro and dialkylamino; $n$ is an integer from 0 to 5; $R^1$ and $R^2$ are independently selected from the group consisting of hydrogen and alkyl; Q is selected from the group consisting of oxygen, sulfur and alkylene; $m$ is an integer from 0 to 1; and Y is cycloalkyl, optionally substituted with halogen or alkyl. This invention further discloses new herbicidal compositions comprising an inert carrier and, as an essential active ingredient, in a quantity toxic to weeds, a compound of the above description.

5 Claims, No Drawings

N-CYCLOALKYLTHIOCARBONYLOXY-SUBSTITUTED N-PHENYLUREAS

This application is a division of our co-pending appliation Ser. No. 781,584, now U. S. Pat. No. 3,637,795.

This invention relates to new compositions of matter and more particularly to new chemical compounds of the formula

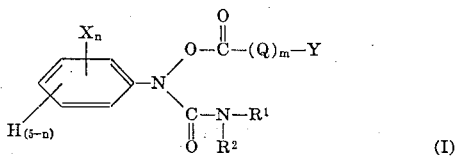

wherein X is selected from the group consisting of alkyl, alkenyl, halogen, haloalkyl, alkoxy, alkylthio, nitro and dialkylamino; $n$ is an integer from 0 to 5; $R^1$ and $R^2$ are independently selected from the group consisting of hydrogen and alkyl; Q is selected from the group consisting of oxygen, sulfur and alkylene, $m$ is an integer of from 0 to 1; and Y is selected from the group consisting of cycloalkyl and substituted cycloalkyl, wherein the substituents are selected from the group consisting of alkyl and halogen.

In a preferred embodiment of this invention X is selected from the group consisting of lower alkyl, lower alkenyl, chlorine, bromine, lower haloalkyl, lower alkoxy, lower alkylthio, nitro and di(lower alkyl)amino; $n$ is an integer from 0 to 3; $R^1$ and $R^2$ are independently selected from the group consisting of hydrogen and lower alkyl; Q is selected from the group consisting of oxygen, sulfur and alkylene having from one to four carbon atoms; $m$ is an integer from 0 to 1; and Y is selected from the group consisting of cycloalkyl havin a maximum of 8 carbon atoms and substituted cycloalkyl, wherein the substituents are selected from the group consisting of lower alkyl, chlorine and bromine.

The term lower as used herein designates a straight or branched carbon chain having a maximum of 10 carbon atoms.

The compounds of the present invention are unexpectedly useful as herbicides.

The new compounds of the present invention can be readily prepared by reacting a hydroxyurea of the formula

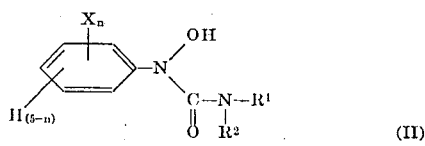

wherein X, $n$, $R^1$ and $R^2$ are as heretofore described, with a compound of the formula

wherein A is halogen, preferably chlorine or bromine; and Q, $m$ and Y are as heretofore described. This reaction can be conveniently carried out in an inert organic reaction medium such as ether by adding an equimolar or slight excess molar amount of the compound of Formula III to the hydroxyurea of Formula II in the presence of an acid acceptor such as a tertiary amine salt or an alkali metal hydroxide or carbonate. Mild reaction conditions can be employed to effect this reaction and temperatures of from about 0° to about 60° C and preferably temperatures of from about 20° to about 40° C can be employed. The reaction mixture can then be stirred for a period of from about one-half to about 8 hours to ensure the completion of the reaction. Thereafter the desired product can be recovered by first filtering the reaction mixture to remove the acid acceptor halide salt and then evaporating the solvent used. The product can then be used as such or can be further purified by conventional techniques such as recrystallization, trituration, washing, distillation, and the like.

Exemplary suitable hydroxyureas for the purpose of preparing the new compounds of this invention are 1-hydroxy-1-phenylurea, 1-hydroxy-1-phenyl-3-methylurea, 1-hydroxy-1-phenyl-3,3-dimethylurea, 1-hydroxy-1-(2-methylphenyl)-3-methylurea, 1-hydroxy-1-(3-chlorophenyl)-3-methylurea, 1-hydroxy-1-(3,4-dichlorophenyl)-3-methylurea, 1-hydroxy-1-(4-bromophenyl)-3,3-dimethylurea, 1-hydroxy-1-(4-allylphenyl)-3-ethylurea, 1-hydroxy-1-(2-methoxyphenyl)-3-isopropylurea, 1-hydroxy-1-(3-nitrophenyl)-3-methylurea, 1-hydroxy-1-(2-dimethylaminophenyl)-3-methylurea, 1-hydroxy-1-(2-methyl-4-chlorophenyl)-3,3-dimethylurea, 1-hydroxy-1-(3,4,5-trichlorophenyl)-3,3-diethylurea and 1-hydroxy-1-(4-chlorophenyl)-3-methyl-3-t-butylurea.

Exemplary suitable compounds of Formula III are cycloalkylcarbonyl halides such as cyclopropylcarbonyl chloride, cyclobutylcarbonyl chloride, cyclopentylcarbonyl chloride, cyclohexylcarbonyl chloride, cycloheptylcarbonyl chloride, cyclooctylcarbonyl chloride, 2-methylcyclopropylcarbonyl chloride, 2-chlorocyclopentylcarbonyl chloride, 3,4-dibromocyclohexylcarbonyl chloride, and the like; cycloalkyl haloformates such as cyclopropyl chloroformate, cyclobutyl chloroformate, cyclopentyl chloroformate, cyclohexyl chloroformate, cycloheptyl chloroformate, cyclooctyl chloroformate, 4-isopropylcyclohexyl chloroformate, 3-chlorocyclopentyl chloroformate and 2-methyl-4-chlorocyclohexyl chloroformate; and cycloalkyl halothioloformates such as cyclopropyl chlorothioloformate, cyclobutyl chlorothioloformate, cyclopentyl chlorothioloformate, cycloheptyl chlorothioloformate, cyclohexyl chlorothioloformate, and the like.

The manner in which the compounds of the present invention can be prepared readily is more specifically illustrated in the following examples.

EXAMPLE 1

Preparation of 1-Phenyl-1-cyclopropylcarbonyloxy-3,3-dimethylurea

A solution of 1-phenyl-1-hydroxy-3,3-dimethylurea (5 grams;) in ether (200 ml) and triethylamine (4 ml) were charged into a glass reaction flask equipped with a mechanical stirrer. The mixture was cooled to about 0° C and cyclopropylcarbonyl chloride (2.9 grams) was slowly added thereto. After the addition was completed the reaction mixture was stirred for a period of about 2 hours. The reaction mixture was then filtered to remove the triethylamine hydrochloride and pentane was added to the filtrate resulting in the formation of a white crystalline solid. The solid was recovered by filtration and was dried under vacuum to yield the desired product 1-phenyl-1-cyclopropylcarbonyloxy-3,3-dimethylurea having a melting point of 60° to 61° C.

EXAMPLE 2

Preparation of 1-(3-methylphenyl)-1-cyclopropylcarbonyloxy-3,3-dimethylurea 1-(3-Methylphenyl)-1-hydroxy-3,3-dimethylurea (5 grams) dissolved in diethyl ether (400 ml) and triethylamine (4 ml) were charged into a glass reaction flask equipped with a mechanical stirrer. The solution was cooled to about 10° C and cyclopropylcarbonyl chloride (2.8 grams) was slowly added thereto. The reaction mixture was stirred for a period of about 1 hour. After this time the mixture was filtered to remove the triethylamine hydrochloride. The filtrate was then stripped of solvent and the resulting residue washed with pentane and vacuum dried to yield the desired product 1-(3-methylphenyl)-1-cyclopropylcarbonyloxy-3,3-dimethylurea as a crystalline solid having a melting point of 96° to 97° C.

EXAMPLE 3

Preparation of 1-(3-Methylphenyl)-1-cyclopropylcarbonyloxy-3-methylurea

A solution of 1-(3-methylphenyl)-1-hydroxy-3-methylurea (5 grams) in diethyl ether (200 ml) and triethylamine (4 ml) were charged into a glass reaction flask equipped with mechanical stirrer. The solution was cooled to a temperature of about 0° C and cyclopropylcarbonyl chloride (2.9 grams) was added thereto. The reaction mixture was stirred for a period of about 1 hour resulting in the formation of a precipitate. The precipitate was recovered by filtration, was washed with water, and was dried. The dried precipitate was then recrystallized from benzene to yield the desired product 1-(3-methylphenyl)-1-cyclopropylcarbonyloxy-3-methylurea having a melting point of 123° to 124° C.

EXAMPLE 4

Preparation of 1-(3-Chlorophenyl)-1-cyclopropylcarbonyloxy-3-methylurea 1-(3-Chlorophenyl)-1-hydroxy-3-methylurea (6 grams) dissolved in diethyl ether (400 ml) and triethylamine (4.4 ml) were charged into a glass reaction flask equipped with mechanical stirrer. The solution was cooled to a temperature of about 0° C and cyclopropylcarbonyl chloride (3.1 grams) was added thereto. After the addition was completed the reaction mixture was stirred for a period of about 2 hours. After this time the mixture was filtered to remove the triethylamine hydrochloride and the filtrate was stripped of solvent to yield a residue. The residue was recrystallized from a chloroform-pentane mixture to yield the desired product 1-(3-chlorophenyl)-1-cyclopropylcarbonyloxy-3-methylurea having a melting point of 109° to 111° C.

EXAMPLE 5

Preparation of 1-(4-Bromophenyl)-1-cyclopropylcarbonyloxy-3-methylurea

A solution of 1-(4-bromophenyl)-1-hydroxy-3-methyl-urea (4 grams) in chloroform (100 ml) and triethylamine (2.4 ml) were charged into a glass reaction flask equipped with a mechanical stirrer. The solution was cooled and cyclopropylcarbonyl chloride (1.7 grams) was slowly added thereto. After the addition was completed the reaction mixtue was stirred for a period of about 1 hour. After this time the reaction mixture was washed with water, was dried over anhydrous magnesium sulfate, and filtered. The filtrate was concentrated by evaporation to a volume of 30 ml and pentane (70 ml) was added thereto resulting in the formation of a crystalline solid. The solid was recovered by filtration and was vacuum dried to yield the desired product 1-(4-bromophenyl)-1-cyclo-propylcarbonyloxy-3-methylurea as a tan solid having a melting point of 128° to 129° C.

EXAMPLE 6

Preparation of 1-(3,4-Dichlorophenyl)-1-cyclopropylcarbonyloxy-3-methylurea

A solution of 1-(3,4-dichlorophenyl)-1-hydroxy-3-methylurea (7 grams) in diethyl ether (400 ml) and triethylamine (4.4 ml) were charged into a glass reaction flask equipped with mechanical stirrer. The mixture was cooled to about 0° C and cyclopropylcarbonyl chloride (3.1 grams) was added thereto. After the addition was completed the reaction mixture was stirred for a period of about 2 hours. After this time the mixture was filtered to remove the triethylamine hydrochloride that had formed. The filtrate was stripped of solvent to yield the desired product 1-(3,4-dichlorophenyl)-1-cyclopropylcarbonyloxy-3-methylurea as the residue having a melting point of 92° to 93° C.

EXAMPLE 7

Preparation of 1-(3,4,6-Trichlorophenyl)-1-cyclopropylcarbonyloxy-3-methylurea

A solution of 1-(3,4,6-trichlorophenyl)-1-hydroxy-3-methylurea (8 grams) in chloroform (400 ml) and triethylamine (4.4 ml) were charged into a glass reaction flask equipped with mechanical stirrer. The mixture was cooled and cyclopropylcarbonyl chloride was slowly added thereto. After the addition was completed the reaction mixture was stirred for a period of about 2 hours. After this time the reaction mixture was washed with water to remove the triethylamine hydrochloride and was dried over anhydrous magnesium sulfate. The dried solution was then stripped to solvent to yield the desired product 1-(3,4,6-trichlorophenyl)-1-cyclopropylcarbonyloxy-3-methylurea having a melting point of 139° to 140° C.

EXAMPLE 8

Preparation of 1-(3-Bromo-4-methylphenyl)-1-cyclopropylcarbonyloxy-3-methylurea

A solution of 1-(3-bromo-4-methylphenyl)-1-hydroxy-3-methylurea (8 grams) in diethyl ether (400 ml) and triethylamine (4.6 ml) were charged into a glass reaction flask equipped with mechanical stirrer. The mixture was cooled to a temperature of about 0° C and cyclopropylcarbonyl chloride (3.3 grams) was slowly added thereto. After the addition was completed the mixture was stirred for a period of about 1 hour resulting in the formation of a precipitate. The precipitate was recovered by filtration and was washed with water to remove the triethylamine hydrochloride. The washed solid was dried and dissolved in dichloromethane. The resulting solution was filtered and stripped of solvent to yield the desired product 1-(3-bromo-4-methylphenyl)-1-cyclopropylcarbonyloxy-3-methylurea having a melting point of 116° to 118° C.

EXAMPLE 9

Preparation of 1-(3,4-Dichlorophenyl)-1-cyclohexyloxycarbonyloxy-3-methylurea 1-(3,4-Dichlorophenyl)-1-hydroxy-3-methylurea (8 grams) dissolved in diethyl ether (600 ml) and triethylamine (5 ml) were charged into a glass reaction flask equipped with a mechanical stirrer. The mixture was cooled to a temperature of about 0° C and cyclohexyl chloroformate (5.8 grams) was slowly added thereto. After the addition was completed the mixture was stirred for a period of about 2 hours. After this time the mixture was filtered to remove the triethylamine hydrochloride which had formed. The filtrate was then concentrated by evaporation to a volume of about 80 ml and pentane was added thereto resulting in the formation of a white crystalline solid. The solid was recovered by filtration and was dried under vacuum to yield the desired product 1-(3,4-dichlorophenyl)-1-cyclohexyloxycarbonyloxy-3-methylurea having a melting point of 77° to 79° C.

EXAMPLE 10

Preparation of 1-(3-Bromo-4-methylphenyl)-1-cyclohexyloxycarbonyloxy-3-methylurea 1-(3-Bromo-4-methylphenyl)-1-hydroxy-3-methylurea dissolved in diethyl ether (600 ml) and triethylamine (5 ml) were charged into a glass reaction flask equipped with mechanical stirrer. The mixture was cooled to about 0° C and cyclohexylchloroformate (5 grams) was slowly added thereto. After the addition was completed the mixture was stirred for a period of about 2 hours. After this time the mixture was filtered to remove the triethylamine hydrochloride which had formed. The filtrate was then concentrated under vacuum to a volume of about 80 ml and pentane was added thereto resulting in the formation of a white crystalline solid. The solid was recovered by filtration and was dried to yield the desired product 1-(3-bromo-4-methylphenyl)-1-cyclohexyloxycarbonyloxy-3-methylurea having a melting point of 97° to 98° C.

Additional compounds within the scope of this invention can be prepared by the methods detailed in the foregoing examples. In the following examples are presented the essential ingredients required to prepare the indicated named compounds by the procedures heretofore described.

EXAMPLE 11

1-(3-Iodo-4-isopropylphwnyl)-1-hydroxy-3-ethylurea + cyclopropyl chloroformate + triethylamine = 1-(3-iodo-4-isopropylphenyl)1-cyclopropyloxycarbonyloxy-3-ethylurea.

EXAMPLE 12

1-(2-Allyl-4-nitrophenyl)-1-hydroxy-3-n-butylurea + cyclobutyl chloroformate + triethylamine = 1-(2-allyl-4-nitrophenyl)-1-cyclobutyloxycarbonyloxy-3-n-butylurea.

EXAMPLE 13

1-(4-Trifluoromethylphenyl)-1-hydroxy-3,3-di-n-propylurea + cyclopentylcarbonyl chloride + triethylamine = 1-(4-trifluoromethylphenyl)-1-cyclopentylcarbonyloxy-3,3-di-n-propylurea.

EXAMPLE 14

1-(2-Methoxy-4-n-pentylphenyl)-1-hydroxy-3-n-hexylurea + cycloheptyl chlorothioloformate + triethylamine = 1-(2-methoxy-4-n-pentylphenyl)-1-cycloheptylthiocarbonyloxy-3-n-hexylurea.

EXAMPLE 15

1-(3-Dimethylamino-5-fluorophenyl)-1-hydroxy-3,3-di-n-decylurea + cyclopropyl chlorothioloformate + triethylamine = 1-(3-dimethylamino-5-fluorophenyl)-1-cyclopropylthiocarbonyloxy-3,3-di-n-decylurea.

EXAMPLE 16

1-(3-Isopropoxy-5-trichloromethylphenyl)-1-hydroxy-3,3-di-n-pentylurea + cyclooctyl chloroformate + triethylamine = 1-(3-isopropoxy-5-trichloromethylphenyl)-1-cyclooctyloxycarbonyloxy-3,3-di-n-pentylurea.

EXAMPLE 17

1-(2-n-Decyl-4-n-decyloxyphenyl)-1-hydroxy-3-methylurea + 3-methylcyclopentylcarbonyl chloride + triethylamine = 1-(2-n-decyl-4-n-decyloxyphenyl)-1-(3-methylcyclopentylcarbonyloxy)-3-methylurea.

EXAMPLE 18

1-(3,4-Dichlorophenyl)-1-hydroxy-3-methylurea + 3-chlorocyclohexyl chloroformate + triethylamine = 1-(3,4-dichlorophenyl)-1-(3-chlorocyclohexyloxycarbonyloxy)-3-methylurea.

EXAMPLE 19

1-(3,4-Dichlorophenyl)-1-hydroxy-3-methylurea + 3-bromohexyl chloroformate + triethylamine = 1-(3,4-dichlorophenyl)-1-(3-bromocyclohexyloxycarbonyloxy)-3-methylurea.

EXAMPLE 20

1-(3-Methylphenyl)-1-hydroxy-3-methylurea + 3,4-dichlorocyclohexyl chloroformate + triethylamine = 1-(3-methylphenyl)-1-(3,4-dichlorocyclohexyloxycarbonyloxy)-3-methylurea.

EXAMPLE 21

1-(4-Methylthiophenyl)-1-hydroxy-3,3-dimethylurea + 3-n-butycyclohexyl chloroformate + triethylamine = 1-(4-methylthiophenyl)-1-(3-n-butylcyclohexyloxycarbonyloxy)-3,3-dimethylurea.

EXAMPLE 22

1-(3-t-Butylthiophenyl)-1-hydroxy-3,3-dimethylurea + 3-methylcyclobutyl chloroformate + triethylamine = 1-(3-t-butylthiophenyl)-1-(3-methylcyclobutyloxycarbonyloxy)-3,3-dimethylurea.

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculities, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 23

Preparation of a Dust

| | |
|---|---|
| Product of Example 1 | 10 |
| Powdered Talc | 90 |

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and, as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5 percent to about 95 percent of the active ingredients in the herbicidal compositions. Use of combinations of these other herbicides and/or defoliants, dessicants, etc., with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4CPB, 4-CPA, 4-CPP, 2,4,5-TB, 2,4,5-TES, 3,4-DA, silvex, and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate, and the like; substituted urea herbicides such as norea, siduron, dichloral urea, chloroxuron, cycluron, fenuron, monuron, monuron TCA, diuron, linuron, monolinuron, neburon, buturon, trimeturon, and the like; symmetrical triazine herbicides such as simazine, chlorazine atratone, desmetryne, norazine, ipazine, prometryn, atrazine, trietazine, simetone, prometone, propazine, ametryne, and the like; chloroacetamide herbicides such as alpha-chloro-N,N-dimethylacetamide, CDEA, CDAA, alpha-chloro-N-isopropylacetamide, 2-chloro-N-isopropylacetanilide, 4-(chloroacetyl)morpholine, 1-(chloroacetyl)piperldine, and the like; chlorinated aliphatic acid herbicides such as TCA, dalapon, 2,3-dichloropropionic acid, 2,2,3-TPA, and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4-dichloro-3-nitrobenzoic acid, and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, O-S-dimethyl tetrachlorothioterephthalate, methyl 2,3,5,6-tetrachloro-N-methoxy-N-methylterephthalamate, 2-[(4-chloro-o-tolyl)-oxy]-N-methoxyacetamide, DSMA, MSMA, potassium azide, acrolein, benefin, bensulide, AMS, bromacil, bromoxynil, DNAP, CMA, CPMF, cypromid, DCB, DCPA, dichlone, diphenatril, DMTT, D NAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calcium cyanamid, DEF, ethyl xanthogen disulfide, sindone, sindone B, propanil, and the like.

Such herbicides can also be used in the methods and compositions of this invention in the form of their salts, esters, amides and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, roundleaved mallow, bull thistle, hounds-tongue, moth mullein and purple star thistle; or perennials such as white cockle, perennial rye-grass, quack-grass, Johnson grass, Canada thistle, hedge bindweed, Bermuda grass, sheep sorrel, curly dock, nutgrass, field chickweed, dandelion, campanula, field bindweed, Russian Knapweed, mesquite, toadflax, yarrow, aster, gromwell, horsetail, ironweed, sesbania, bulrush, cattail and winter-cress.

Similarly, such weeds can be classified as broadleaf or grassy weeds. it is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post- emergence testing.

The herbicidal activity of the compounds of this invention was demonstrated by experiments carried out for the pre-emergency control of mustard weeds. In these experiments small plastic greenhouse pots filled with dry soil were seeded with mustard weed seeds. 24 hours or less after seeding the pots were sprayed with water until the soil was wet and the test compounds formulated as aqueous emulsions of acetone solutions containing emulsifiers were sprayed at the indicated concentrations on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0 = no injury, 1,2 = slight injury, 3,4 = moderate injury, 5,6 = moderately severe injury, 7,8,9 = severe injury and 10 = death. The effectiveness of these compounds is demonstrated by the following data.

In those instances wherein replicate tests were performed the average value for all replicates is given.

TABLE I

| Test Compound | Concentration of Test Compound in lbs/acre | Injury Rating |
|---|---|---|
| Product of Example 1 | 8 | 10 |
| -do- | 4 | 10 |
| -do- | 2 | 10 |
| -do- | 1 | 7 |
| Product of Example 2 | 8 | 10 |
| -do- | 4 | 10 |
| -do- | 2 | 8 |
| -do- | 1 | 6 |
| Product of Example 3 | 8 | 10 |
| -do- | 4 | 9.6 |
| -do- | 2 | 10 |
| -do- | 1 | .5 |
| Product of Example 4 | 8 | 10 |
| -do- | 4 | 9.2 |
| -do- | 2 | 9.6 |
| -do- | 1 | 2.7 |
| Product of Example 5 | 8 | 10 |
| -do- | 4 | 10 |
| -do- | 2 | 7 |
| -do- | 1 | 3 |
| Product of Example 6 | 8 | 5 |
| -do- | 4 | 6.7 |
| -do- | 2 | 7 |
| -do- | 1 | 6 |
| Product of Example 7 | 8 | 10 |
| -do- | 4 | 9.6 |
| -do- | 2 | 5.6 |
| -do- | 1 | 1.7 |
| Product of Example 9 | 8 | 10 |
| -do- | 4 | 6.3 |
| -do- | 2 | 5.6 |
| -do- | 1 | 4.5 |

We claim:
1. A compound of the formula

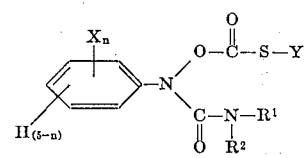

wherein X is selected from the group consisting of lower alkyl, lower alkenyl, halogen, lower haloalkyl, lower alkoxy, lower alkylthio, nitro and di(lower alkyl)amino; n is an integer from 0 to 3; $R^1$ and $R^2$ are independently selected from the group consisting of hydrogen and lower alkyl; and Y is selected from the group consisting of cycloalkyl having a maximum of eight carbon atoms and substituted cycloalkyl, wherein the substituents are selected from the group consisting of lower alkyl, chlorine and bromine.

2. A compound of claim 1, wherein Y is selected from the group consisting of cyclopropyl, cyclobutyl, cyclopentyl and cyclohexyl.

3. A compound of claim 1, wherein X is selected from the group consisting of lower alkyl and halogen.

4. 1-(2-methoxy-4-n-pentylphenyl)-1-cycloheptylthiocarbonyloxy-3-n-hexylurea.

5. 1-(3-dimethylamino-5-fluorophenyl)-1-cyclopropylthiocarbonyloxy-3,3-di-n-decylurea.

* * * * *